Aug. 16, 1966 EIJI IZUMIYAMA 3,267,367
METHOD OF DETECTING DEFECTS BY MEANS OF MAGNETIC
TAPE AS A SLIDE TRANSFER MEDIUM
Filed July 1, 1963

INVENTOR.
EIJI IZUMIYAMA
BY
Bailey, Stephens & Huettig
ATTORNEYS

United States Patent Office 3,267,367

Patented August 16, 1966

3,267,367

METHOD OF DETECTING DEFECTS BY MEANS OF MAGNETIC TAPE AS A SLIDE TRANSFER MEDIUM

Eiji Izumiyama, Omiya, Japan, assignor to Japan Aircraft Manufacturing Co., Ltd., Yokohama, Japan, a corporation of Japan

Filed July 1, 1963, Ser. No. 291,916
Claims priority, application Japan, July 2, 1962, 37/27,168
2 Claims. (Cl. 324—37)

This invention relates generally to a method of detecting defects in magnetic materials by means of sliding magnetic tape or sheet and has for its object to provide an improved method of detecting defects in magnetic materials, in which a magnetic tape or sheet is caused to slide while being held in close contact with the magnetic material under inspection or detection for magnetically recording any pattern of defects in the material and a detector is caused to slide along the magnetic tape or sheet with a record of defects thus transferred thereto along a rectilinear path for the purpose of producing a detector output voltage.

Another object of the present invention is to enable automatic detection of defects in pipe sections formed of a magnetic material and particularly those found in the welded regions of electric seam welded tubes and also to enable high speed continuous detection of cracks frequently formed in bar materials and particularly in round and rectangular bars longitudinally thereof or longitudinal and transverse surface cracks formed in flat sheet materials.

A method of detecting defects in magnetic materials by means of a magnetic tape or sheet has hitherto been known in which a magnetic flux is passed through the material under inspection with the magnetic tape or sheet held in close contact therewith to obtain a magnetically transferred record of stray fluxes produced from the defects in the magnetic material and a magnetic detector is caused to slide along the magnetic tape or sheet carrying such transfer record to determine a state of the defects in the material under inspection. Such hitherto known method, however, has involved the following drawbacks in practice. With this method, the detector voltage which corresponds to the magnetic record of the defect pattern is proportional to the relative velocity of the magnetic sheet and the detector, whilst at the same time the detector should be held in satisfactorily close contact with the magnetic sheet. Also, in order to obtain a stable detector voltage, the detector should be run over any particular tape section recorded repeatedly in a predetermined time interval. To this end, measures have generally been taken to cause the detector to slide along the magnetic sheet while rotating.

The present invention is intended to overcome such drawbacks involved in the hitherto known method and to provide an improved method in which defects can be detected with success without rotating the detector relative to the magnetic tape or sheet.

According to the present invention, there is provided a method of detecting defects in magnetic materials by means of a magnetic tape or sheet as a slide transfer medium, which comprises holding the magnetic tape or sheet in close contact with the magnetic material under inspection while passing an alternating magnetic flux through the said magnetic material under inspection, causing the relatively sliding between the magnetic tape or sheet and the magnetic material to obtain an alternating magnetic record of the pattern of defects in the material on the magnetic tape or sheet, and causing a detector held in close contact with the magnetic sheet to slide over the said magnetic sheet to obtain a detector output voltage.

The method of detecting defects in the magnetic materials under inspection or detection used herein includes also non-destructive inspections.

The foregoing and other objects, features and advantages of the present invention will become apparent from the following description when taken in conjunction with the accompanying drawings, which illustrate one embodiment of carrying out the present invention in comparison with that of performing the hitherto known method and in which.

Figure 1:
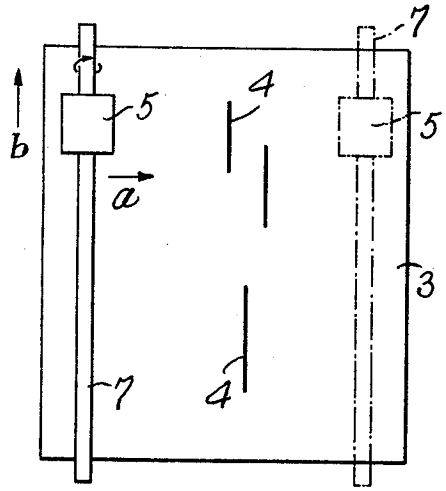
FIG. 1 is a plan view of an embodiment adapted to perform the hitherto known method of detecting defects by means of a magnetic recording sheet.
Figure 2:
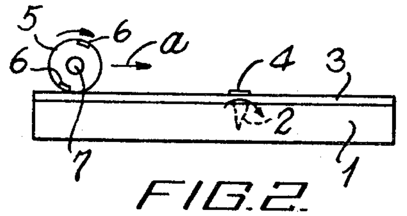
FIG. 2 is a front view of the said embodiment.

Referring first to FIGS. 1 and 2, which illustrate a conventional apparatus for detecting defects in magnetic materials, reference numeral 1 designates a magnetic material under inspection or exmination including a defect or flaw 2 formed therein. 3 designates a magnetic tape or sheet held in close contact with the magnetic material 1. It will be understood that upon passing an alternating magnetic flux through the magnetic material 1 a pattern of defect 4 is formed on the magnetic tape or sheet in an area corresponding to the defective region or portion of the material.

Figure 3:
FIG. 3 illustrates the waveform of the detector voltage as obtained with the magnetic recording tape magnetized according to the conventional method.

A roller 5 is mounted fast on a shaft 7 and carries an appropriate number, for example, two of detectors 6. The roller 5 is not only rotatable about the axis of the shaft 7 but also slidable transversely over the magnetic sheet 3 along a rectilinear path as indictaed by the arrow *a*, for example, by means of an endless belt provided therefor. As the roller 5 is thus moved over the defect pattern 4, a detector output voltage is obtained through the detectors 6 as shown in FIG. 3, the waveform of which includes a change indicating the presence of the defective portion. As illustrated, however the voltage output includes waves arranged at substantial intervals due to the high speed at which the detector roller is rotated and thus any change in the waveform cannot be pronounced enough to be readily observed. In addition, it is to be understood that provision is made to move the magnetic sheet 3 in the longitudinal direction as indicated by the arrow *b* so that the detector roller 5 may slide over the entire area of the magnetic sheet 3 for the detection of defects in the material as indicated at 2 in FIG. 2.

As apparent from the foregoing, according to the conventional known method, the detector roller 5 is moved to slide over the magnetic sheet 3 in a direction at right angles to the pattern of defect thereon while rotating at high speed. In addition, an accurate mechanism is required for continuously holding the magnetic sheet 3 and the detector roller 6 in close contact with each other. Also, the conventional method involves a disadvantage that it is highly susceptible to noises due to the external magnetic field.

Figure 4:
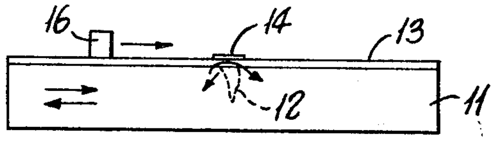
FIG. 4 is a front view of an embodiment adapted to carry out the method of the present invention for the detection of defects in magnetic materials by means of a magnetic recording sheet.
Figure 5:
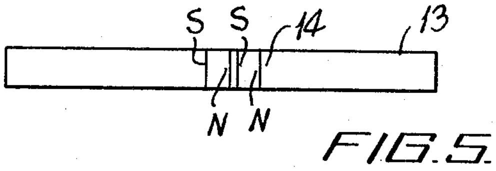
FIG. 5 is a diagrammatic plan view of the residual magnetism pattern obtained with the embodiment shown in FIG. 4.
Figure 6:
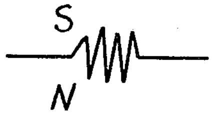
FIG. 6 is an illustration of the waveform of the detector voltage as obtained with the magnetic sheet magnetized according to the inventive method.

Referring next to FIGS. 4 to 6, and particularly to FIGS. 4 and 5, which illustrate one embodiment of carrying out the present invention, reference numeral 11 designates a magnetic material under inspection or examination including defects or flaws 12, and 13 a magnetic tape or sheet held in close contact with the magnetic material 11. In operation, an alternating magnetic flux is passed through the magnetic material 11 whilst at the same time the magnetic tape or sheet 13 is caused to slide to some extent over the magnetic material 11 along a rectilinear path extending at right angles to the flaws. As will be understood, the magnetic tape or sheet 13 is continuously magnetized in an alternating fashion over an area corresponding to the extent to which the magnetic tape slides along a rectilinear path. On this occasion, it is noted that the higher the frequency of the alternating magnetic flux, and the slower the moving speed of the magnetic tape or sheet, the shorter is the wavelength of the recorded pattern of alternating magnetization, as apparent from the following equation.

$$\lambda_R = K_1 \frac{V^1}{f_\Phi}$$

wherein $\lambda_R$ is the wavelength of the magnetization or magnetic record, $v_1$ the sliding relative speed of the magnetic tape and the material to be inspected, $f_\phi$ the frequency of the alternating magnetic flux and $K_1$ a constant.

The magnetic particles on that area of the magnetic tape or sheet 13 which corresponds to any defective portion or region 12 of the magnetic material are magnetized to form a pattern of defect 14 including closely arranged magnets oriented in a direction indicated by S–N in FIG. 5 by the alternating magnetization continuing corresponding to the extent of the rectilinear sliding movement imparted to the magnetic tape or sheet 13.

When a detector 16 is caused to slide over the magnetic tape or sheet 13 closely magnetized by an alternating magnetic flux of such high frequency in a direction at right angles to the defective portion 12, a detector output voltage obtained is inversely proportional to the wavelength of the magnetization flux and in direct proportion to the speed at which the detector 16 slides over the magnetic sheet 13. Accordingly, the detector voltge is expressed by the following equation.

$$E = K_2 \frac{v_2}{\lambda_R}$$

Therefore $$E = K \frac{f_\Phi}{v_1} v_2$$

wherein E is a detector voltage, $f_\phi$ the frequency of the alternating magnetic flux, $v_1$ the speed of the magnetic sheet at which it slides during the magnetization stage, $v_2$ the sliding relative speed of the detector and the magnetic tape, and K, $K_2$ constants.

Accordingly, it is noted that the detector output may be magnified by increasing the frequency of the alternating magnetic flux, decreasing the sliding speed of the magnetic sheet at the time of magnetization, and/or increasing the sliding speed of the detector. The extent of the sliding movement of an ordinary magnetic sheet as required for its magnetization may be limited to a length of the order of as short as 1/10 millimeter to successively obtain several detector pulses since the magnetic sheet is generally readily magnetizable for several tens of cycles at intervals of 1 millimeter. Therefore, the detector 16 may be moved at a relatively low speed to produce a substantial detector voltage without involving any external noises as long as the frequency of the alternating magnetic flux for magnetization and the sliding speeds are properly determined.

One embodiment of the detector voltage obtained by the magnetic sheet 13 is illustrated in FIG. 6, including closely arrnged voltage waves corresponding to the defect pattern 14 on the magnetized sheet 13. It will be appreciated that such waveform facilitates the detection or observation of the defective portion 12 of the magnetic material under inspection or examination as compared to the detector voltage obtained by the conventional method, for example shown in FIG. 3.

As apparent from the foregoing, according to the present invention, a closely magnetized defect pattern 14 can be formed on a magnetic sheet or tape by sliding the latter to a more or less extent along the magnetic material under inspection while a magnetic flux is passing through the material, whereby the defect may be detected by causing a detector 16 to slide along a rectilinear path without any rotation to produce a substantial detector voltage which includes no noises deriving from the external magnetic field. Thus, according to the present invention, detection of any defects present in a magnetic material under inspection is greatly facilitated.

What is claimed is:

1. A method of detecting defects in magnetic materials by means of a magnetic tape as a slide transfer medium, which comprises passing an alternating magnetic flux through the magnetic material to be inspected, causing a magnetic tape to slide along the magnetic material while holding the said magnetic tape in close contact therewith to obtain an alternating magnetic record of defects in the material on the magnetic tape, and causing a detector to slide over the said magnetic tape with the record along a rectilinear path to obtain a detector output voltage.

2. A method of detecting defects in magnetic materials as defined in claim 1, wherein the detector is held in close contact with the magnetic tape.

No references cited.

WALTER L. CARLSON, *Primary Examiner.*

R. J. CORCORAN, *Assistant Examiner.*